United States Patent
Boutier et al.

(10) Patent No.: US 10,150,901 B2
(45) Date of Patent: Dec. 11, 2018

(54) COMPOSITIONS CONTAINING 1,1,1,4,4,4-HEXAFLUOROBUT-2-ENE AND 3,3,4,4,4-PETRAFLUOROBUT-1-ENE

(75) Inventors: Jean-Christophe Boutier, Oullins (FR); Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 508 days.

(21) Appl. No.: 13/991,193

(22) PCT Filed: Nov. 8, 2011

(86) PCT No.: PCT/FR2011/052590
§ 371 (c)(1),
(2), (4) Date: Jun. 3, 2013

(87) PCT Pub. No.: WO2012/072910
PCT Pub. Date: Jun. 7, 2012

(65) Prior Publication Data
US 2013/0247602 A1    Sep. 26, 2013

(30) Foreign Application Priority Data

Dec. 3, 2010    (FR) ..................... 10.60066

(51) Int. Cl.
  *C09K 5/04*    (2006.01)
  *C08J 9/14*    (2006.01)
  *C09K 3/30*    (2006.01)
  *C11D 3/24*    (2006.01)

(52) U.S. Cl.
  CPC ............. *C09K 5/045* (2013.01); *C08J 9/146* (2013.01); *C09K 3/30* (2013.01); *C11D 3/24* (2013.01); *C09K 2205/126* (2013.01); *C09K 2205/22* (2013.01)

(58) Field of Classification Search
  CPC ............. C09K 5/045; C09K 2205/126; C09K 2205/22; C09K 2205/32
  See application file for complete search history.

(56) References Cited

U.S. PATENT DOCUMENTS

| | | |
|---|---|---|
| 5,076,064 A | 12/1991 | Kopko |
| 7,708,903 B2 | 5/2010 | Sievert et al. |
| 7,972,524 B2 | 7/2011 | Robin |
| 7,972,525 B2 | 7/2011 | Robin |
| 8,262,924 B2 | 9/2012 | Robin |
| 8,648,123 B2 | 2/2014 | Van Horn et al. |

(Continued)

FOREIGN PATENT DOCUMENTS

| | | |
|---|---|---|
| JP | 2008-531836 A | 8/2008 |
| JP | 2010-522816 A | 7/2010 |

(Continued)

OTHER PUBLICATIONS

M. S. Kim et al., "A Study to Determine the Existence of an Azeotropic R-22 'Drop-In' Substitute", NISTIR 5784, Department of Commerce, Mar. 1996.*

(Continued)

*Primary Examiner* — John R Hardee
(74) *Attorney, Agent, or Firm* — Buchanan Ingersoll & Rooney P.C.

(57) ABSTRACT

The invention relates to a composition including 1,1,1,4,4, 4-hexafluorobut-2-ene and 3,3,4,4,4-pentafluorobut-1-ene, as well as to use thereof, in particular as a heat transfer fluid.

16 Claims, 1 Drawing Sheet

%weight HFO-E-1336mz (1=100%)

(56) References Cited

U.S. PATENT DOCUMENTS

| | | |
|---|---|---|
| 9,267,066 B2 | 2/2016 | Rached |
| 9,528,038 B2 | 12/2016 | Rached |
| 9,528,039 B2 | 12/2016 | Rached |
| 9,909,045 B2 | 3/2018 | Rached |
| 9,982,178 B2 | 5/2018 | Rached et al. |
| 2007/0096051 A1 | 5/2007 | Nappa et al. |
| 2007/0100009 A1 | 5/2007 | Creazzo et al. |
| 2007/0100010 A1 | 5/2007 | Creazzo et al. |
| 2007/0108403 A1* | 5/2007 | Sievert et al. ............ 252/67 |
| 2007/0187639 A1* | 8/2007 | Leck et al. ............... 252/68 |
| 2009/0143604 A1 | 6/2009 | Nappa et al. |
| 2009/0204444 A1 | 8/2009 | Tucker et al. |
| 2009/0302264 A1 | 12/2009 | Serrano et al. |
| 2010/0056124 A1 | 3/2010 | Keating et al. |
| 2010/0078585 A1 | 4/2010 | Robin |
| 2010/0112328 A1 | 5/2010 | Van Horn et al. |
| 2010/0154419 A1 | 6/2010 | Kontomaris |
| 2010/0163776 A1 | 7/2010 | Robin |
| 2010/0216904 A1 | 8/2010 | Loh et al. |
| 2010/0243943 A1 | 9/2010 | Robin |
| 2010/0326095 A1 | 12/2010 | Van Horn et al. |
| 2011/0001080 A1 | 1/2011 | Van Horn et al. |
| 2011/0006248 A1 | 1/2011 | Van Horn et al. |
| 2011/0088418 A1 | 4/2011 | Kontomaris et al. |
| 2011/0144216 A1 | 6/2011 | Hulse et al. |
| 2011/0197604 A1 | 8/2011 | Minor et al. |
| 2011/0215273 A1 | 9/2011 | Uenveren et al. |
| 2011/0237844 A1 | 9/2011 | Tung et al. |
| 2011/0260093 A1 | 10/2011 | Robin |
| 2012/0004299 A1 | 1/2012 | Hulse et al. |
| 2012/0056124 A1 | 3/2012 | Robin |
| 2012/0085959 A1 | 4/2012 | Uenveren et al. |
| 2012/0117990 A1 | 5/2012 | Rached et al. |
| 2012/0119136 A1 | 5/2012 | Yana Motta et al. |
| 2013/0098396 A1 | 4/2013 | Lousenberg et al. |
| 2013/0099154 A1 | 4/2013 | Boussand et al. |
| 2013/0104575 A1 | 5/2013 | Kontomaris |
| 2013/0111970 A1 | 5/2013 | Johnsen |
| 2013/0255284 A1 | 10/2013 | Rached |
| 2013/0298581 A1 | 11/2013 | Kontomaris |
| 2014/0048739 A1 | 2/2014 | Rached et al. |
| 2014/0083119 A1 | 3/2014 | Rached |
| 2014/0191153 A1 | 7/2014 | Yana Motta et al. |
| 2014/0284516 A1 | 9/2014 | Johnsen |
| 2016/0009973 A1 | 1/2016 | Rached et al. |
| 2018/0155594 A1 | 6/2018 | Rached |

FOREIGN PATENT DOCUMENTS

| | | |
|---|---|---|
| JP | 2010-532395 A | 10/2010 |
| WO | WO 2006/094303 A2 | 9/2006 |
| WO | WO 2007/002625 A2 | 1/2007 |
| WO | WO 2007/002703 A2 | 1/2007 |
| WO | WO 2007/053697 A2 | 5/2007 |
| WO | WO 2008/121776 A1 | 10/2008 |
| WO | WO 2008/134061 A2 | 11/2008 |
| WO | WO 2008/154612 A1 | 12/2008 |
| WO | WO 2009/085937 A1 | 7/2009 |
| WO | WO 2009/108547 A1 | 9/2009 |
| WO | WO 2009/114397 A2 | 9/2009 |
| WO | WO 2009/114398 A1 | 9/2009 |
| WO | WO 2011/015737 A1 | 2/2010 |
| WO | WO 2010/055146 A2 | 5/2010 |
| WO | WO 2010/059677 A2 | 5/2010 |
| WO | WO 2010/062888 A2 | 6/2010 |
| WO | 2010/080467 A2 | 7/2010 |
| WO | WO 2010/100254 A1 | 9/2010 |
| WO | WO 2010/129461 A2 | 11/2010 |
| WO | WO 2010/141527 A1 | 12/2010 |
| WO | WO 2010/141669 A1 | 12/2010 |
| WO | WO 2011/084447 A2 | 7/2011 |
| WO | WO 2011/084553 A2 | 7/2011 |
| WO | WO 2011/137087 A1 | 11/2011 |
| WO | WO 2012/064477 A2 | 5/2012 |
| WO | WO 2012/069725 A1 | 5/2012 |
| WO | WO 2012/072910 A1 | 6/2012 |
| WO | WO 2013/004930 A1 | 1/2013 |

OTHER PUBLICATIONS

U.S. Appl. No. 14/390,609, Rached.
Office Action issued by the European Patent Office in EP 10 816 413.8, dated Apr. 28, 2014, 4 pages.
Rached, U.S. Appl. No. 14/390,609 entitled "Compositions Based on 2,3,3,4,4,4-Hexafluorobut-1-ene," filed in the U.S. Patent and Trademark Office Oct. 3, 2014.
U.S. Appl. No. 13/988,362, Wissam Rached, Laurent Abbas and Jean-Christophe Boutier, filed Jun. 5, 2013.
U.S. Appl. No. 13/989,437, Wissam Rached, filed Jun. 13, 2013.
U.S. Appl. No. 14/117,700, Wissam Rached, filed Nov. 14, 2013.
U.S. Appl. No. 14/390,609, Wissam Rached, filed Oct. 3, 2014.
Rached, Wissam, U.S. Appl. No. 14/844,583 entitled "Compositions of 2,4,4,4-Tetrafluorobut-1-ene and Cis-1,1,1,4,4,4-Hexafluorobut-2-ene," filed in the U.S. Patent and Trademark Office on Sep. 3, 2015.
Rached, Wissam, et al., U.S. Appl. No. 14/861,073 entitled "Compositions of Chloro-Trifluoropropene and Hexafluorobutene," filed in the U.S. Patent and Trademark Office Sep. 22, 2015.
Rached, Wissam, U.S. Appl. No. 14/990,546 entitled "Refrigerants Containing E-1,1,1,4,4,4-Hexafluorobut-2-ene," filed in the U.S. Patent and Trademark Office Jan. 7, 2016.
Rached, Wissam, U.S. Appl. No. 15/885,302 entitled "Compositions Based on 2,3,3,4,4,4-Hexafluorobut-1-ene," filed in the U.S. Patent and Trademark Office on Jan. 31, 2017.
Rached, Wissam, et al., U.S. Appl. No. 15/379,547 entitled "Compositions of Chloro-Trifluoropropene and Hexafluorobutene," filed in the U.S. Patent and Trademark Office on Dec. 15, 2016.
Rached, Wissam, et al., U.S. Appl. No. 15/972,638 entitled "Compositions of Chloro-Trifluoropropene and Hexafluorobutene," filed in the U.S. Patent and Trademark Office on May 7, 2018.

* cited by examiner

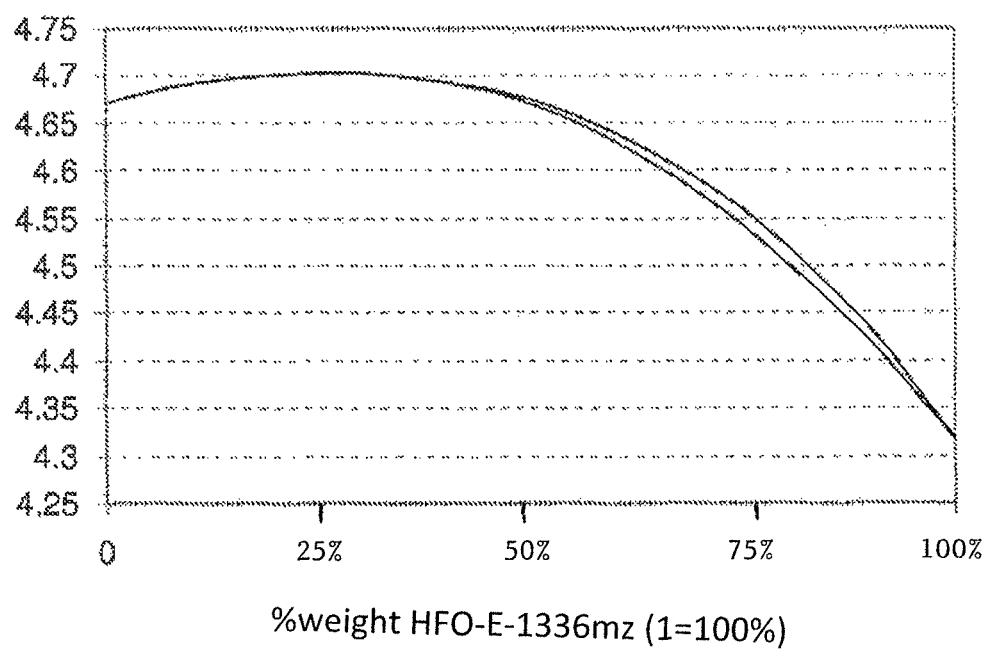

COMPOSITIONS CONTAINING 1,1,1,4,4,4-HEXAFLUOROBUT-2-ENE AND 3,3,4,4,4-PETRAFLUOROBUT-1-ENE

This application claims priority to and is the national phase under 35 USC § 371 of prior PCT International Application Number PCT/FR2011/052590 filed Nov. 8, 2011 which designated the United States of America and claimed priority to French Patent Application serial number 10.60066 filed Dec. 3, 2010.

FIELD OF THE INVENTION

The present invention relates to compositions containing 1,1,1,4,4,4-hexafluorobut-2-ene as a mixture with 3,3,4,4,4-pentafluorobut-1-ene, and to the use thereof, in particular as heat-transfer fluids.

TECHNICAL BACKGROUND

Fluids based on fluorocarbon compounds are widely used in vapor-compression, heat-transfer systems, in particular air conditioning, heat pump, refrigeration or freezing devices. These devices have in common the fact that they are based on a thermodynamic cycle comprising the vaporization of the fluid at low pressure (in which the fluid absorbs heat); the compression of the vaporized fluid up to a high pressure; the condensation of the vaporized fluid to liquid at high pressure (in which the fluid releases heat); and the expansion of the fluid in order to complete the cycle.

The choice of a heat-transfer fluid (which may be a pure compound or a mixture of compounds) is dictated, on the one hand, by the thermodynamic properties of the fluid and, on the other hand by additional constraints. Thus, one particularly important criterion is that of the impact of the fluid under consideration on the environment. In particular, chlorinated compounds (chlorofluorocarbons and hydrochlorofluorocarbons) have the disadvantage of damaging the ozone layer. Henceforth, generally non-chlorinated compounds such as hydrofluorocarbons, fluoroethers and fluoroolefins are therefore preferred to them.

It is, however, necessary to develop other heat-transfer fluids which have a global warming potential (GWP) lower than that of the heat-transfer fluids currently used, and which have equivalent or improved performance levels.

Document WO 2007/053697 describes compositions based on fluoroolefins in various uses, and in particular as heat-transfer fluids. The document mentions 1,1,1,4,4,4-hexafluorobut-2-ene.

Document WO 2008/134061 describes azeotropic or azeotrope-like compositions comprising (Z)-1,1,1,4,4,4-hexafluorobut-2-ene in combination with methyl formate, pentane, 2-methylbutane, 1,1,1,3,3-pentafluorobutane, trans-1,2-dichloroethylene or 1,1,1,3,3-pentafluoropropane.

WO 2008/154612 describes azeotropic or azeotrope-like compositions comprising (E)-1,1,1,4,4,4-hexafluorobut-2-ene in combination with methyl formate, n-pentane, 2-methylbutane, trans-1,2-dichloroethylene, 1,1,1,3,3-pentafluoropropane, n-butane or isobutane.

Document WO 2010/055146 describes fluoroolefins and the process for producing them. The document mentions in particular (E)-1,1,1,4,4,4-hexafluorobut-2-ene.

Document WO 2010/100254 describes tetrafluorobutenes, optionally as a mixture with hexafluorobutenes, and the use thereof in various applications, including heat transfer.

However there is still a need to develop other heat-transfer fluids which have a relatively low GWP and which are capable of replacing the usual heat-transfer fluids.

In particular, it is desirable to develop other heat-transfer fluids with a low GWP which are azeotrope-like and/or which have good energy performance levels compared with the usual heat-transfer fluids (such as isobutane) and/or improved energy performance levels compared with known heat-transfer fluids with a low GWP (such as 1,3,3,3-tetrafluoropropene).

SUMMARY OF THE INVENTION

The invention relates first and foremost to a composition comprising 1,1,1,4,4,4-hexafluorobut-2-ene and 3,3,4,4,4-pentafluorobut-1-ene.

According to one embodiment, the composition comprises or preferably consists of:
 from 0.1 to 99.9% of 1,1,1,4,4,4-hexafluorobut-2-ene and
  from 0.1 to 99.9% of 3,3,4,4,4-pentafluorobut-1-ene; or
 from 1 to 99% of 1,1,1,4,4,4-hexafluorobut-2-ene and
  from 1 to 99% of 3,3,4,4,4-pentafluorobut-1-ene.

According to one embodiment, the 1,1,1,4,4,4-hexafluorobut-2-ene is in the form of the trans isomer, or of the cis isomer, or of a mixture of the trans isomer and the cis isomer, and is preferably in the form of the trans isomer.

A subject of the invention is also the use of the composition above, as a heat-transfer fluid.

A subject of the invention is also a heat-transfer composition, comprising the composition above and also one or more additives chosen from lubricants, stabilizers, surfactants, tracers, fluorescent agents, odorous agents and solubilizing agents, and mixtures thereof.

A subject of the invention is also heat-transfer equipment comprising a vapor compression circuit containing the composition above as a heat-transfer fluid or containing a heat-transfer composition as described above.

According to one embodiment, the equipment is chosen from mobile or stationary heat-pump heating, air conditioning, refrigeration and freezing equipment and Rankine cycles.

A subject of the invention is also a process for heating or for cooling a fluid or a body by means of a vapor compression circuit containing a heat-transfer fluid, said process successively comprising evaporation of the heat-transfer fluid, compression of the heat-transfer fluid, condensation of the heat-transfer fluid and expansion of the heat-transfer fluid, wherein the heat-transfer fluid is the composition above.

According to one embodiment, this process is a process for cooling a fluid or a body, wherein the temperature of the fluid or of the body cooled is from −15° C. to 15° C., preferably from −10° C. to 10° C. and more particularly preferably from −5° C. to 5° C.; or is a process for heating a fluid or a body, wherein the temperature of the fluid or of the body heated is from 30° C. to 90° C., preferably from 35° C. to 60° C. and more particularly preferably from 40° C. to 50° C.

A subject of the invention is also a process for reducing the environmental impact of heat-transfer equipment comprising a vapor compression circuit containing an initial heat-transfer fluid, said process comprising a step of replacing the initial heat-transfer fluid in the vapor compression circuit with a final heat-transfer fluid, the final heat-transfer fluid having a GWP which is lower than the initial heat-transfer fluid, wherein the final heat-transfer fluid is the composition above.

A subject of the invention is also the use of the composition above, as a solvent.

A subject of the invention is also the use of the composition above, as a blowing agent.

A subject of the invention is also the use of the composition above, as a propellant, preferably for an aerosol.

A subject of the invention is also the use of the composition above, as a cleaning agent.

The present invention makes it possible to meet the needs felt in the prior art. It more particularly provides novel compositions with a low GWP which are capable of being used (inter alia) as heat-transfer fluids, in particular as a replacement for the usual heat-transfer fluids.

In particular, when the 1,1,1,4,4,4-hexafluorobut-2-ene is in trans form, the compositions according to the invention are azeotropic or azeotrope-like.

In certain embodiments, the invention provides heat-transfer fluids which have good energy performance levels compared with usual heat-transfer fluids and/or have improved energy performance levels compared with the known heat-transfer fluids with a low GWP (in particular compared with 1,1,1,3,3-pentafluoropropane).

In certain embodiments, the compositions according to the invention in particular have an improved volumetric capacity and/or an improved coefficient of performance compared with the compositions of the prior art.

BRIEF DESCRIPTION OF THE FIGURE

FIG. 1 represents the vapor/liquid equilibrium data at 50° C. of binary mixtures of HFO-1345fz and HFO-E-1336mzz, demonstrating the existence of an azeotrope and of azeotrope-like products. The proportion of HFO-E-1336mz between 0 and 1 (=100%) is represented along the x-axis, and the pressure in bar is represented along the y-axis.

DESCRIPTION OF EMBODIMENTS OF THE INVENTION

The invention is now described in greater detail and in a nonlimiting manner in the description which follows.

The compounds used in the context of the invention are denoted as follows:
1,1,1,4,4,4-hexafluorobut-2-ene: HFO-1336mzz;
(E)-1,1,1,4,4,4-hexafluorobut-2-ene (or 1,1,1,4,4,4-hexafluorobut-2-ene in trans form): HFO-E-1336mzz;
(Z)-1,1,1,4,4,4-hexafluorobut-2-ene (or 1,1,1,4,4,4-hexafluorobut-2-ene in cis form): HFO-Z-1336mzz;
3,3,4,4,4-pentafluorobut-1-ene: HFO-1345fz;
1,1,1,3,3-pentafluoropropane: HFC-245fa.

Unless otherwise mentioned, throughout the application, the proportions of compounds indicated are given as percentages by weight.

According to the present application, the global warming potential (GWP) is defined with respect to carbon dioxide and with respect to a period of 100 years, according to the method indicated in "The scientific assessment of ozone depletion, 2002, a report of the World Meteorological Association's Global Ozone Research and Monitoring Project".

The term "heat-transfer compound", respectively "heat-transfer fluid" (or refrigerant), is intended to mean a compound, respectively a fluid, capable of absorbing the heat by evaporating at low temperature and low pressure and of releasing heat by condensing at high temperature and high pressure, in a vapor compression circuit. Generally, a heat-transfer fluid can comprise just one, two, three or more than three heat-transfer compounds.

The term "heat-transfer composition" is intended to mean a composition comprising a heat-transfer fluid and, optionally, one or more additives which are not heat-transfer compounds for the intended application.

The additives can in particular be chosen from lubricants, stabilizers, surfactants, tracers, fluorescent agents, odorous agents and solubilizing agents.

The stabilizer(s), when they are present, preferably represent at most 5% by weight in the heat-transfer composition. Among the stabilizers, mention may in particular be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether, butylphenyl glycidyl ether, phosphites, phosphonates, thiols and lactones.

As lubricants, use may in particular be made of oils of mineral origin, silicone oils, paraffins of natural origin, naphthenes, synthetic paraffins, alkylbenzenes, poly-alpha-olefins, polyalkene glycols, polyol esters and/or polyvinyl ethers.

As tracers (capable of being detected), mention may be made of deuterated or nondeuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different than the heat-transfer compound(s) of which the heat-transfer fluid is composed.

As solubilizing agents, mention may be made of hydrocarbons, dimethyl ether, polyoxyalkylene ethers, amides, ketones, nitriles, chlorocarbons, ethers, lactones, aryl ethers, fluoroethers and 1,1,1-trifluoroalkanes. The solubilizing agent is different than the heat-transfer compound(s) of which the heat-transfer fluid is composed.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odorous agents, mention may be made of alkyl acrylates, allyl acrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridole, o-methoxy(methyl)phenol and combinations thereof.

The heat-transfer process according to the invention is based on the use of equipment comprising a vapor compression circuit which contains a heat-transfer fluid. The heat-transfer process can be a process for heating or for cooling a fluid or a body.

The vapor compression circuit containing a heat-transfer fluid comprises at least one evaporator, one compressor, one condenser and one pressure-reducing valve, and also lines for transporting the heat-transfer fluid between these elements. The evaporator and the condenser comprise a heat exchanger that allows an exchange of heat between the heat-transfer fluid and another fluid or body.

As a compressor, use may in particular be made of a centrifugal compressor with one or more stages or a centrifugal mini compressor. Rotary compressors, reciprocating compressors or screw compressors can also be used. The compressor may be driven by an electric motor or by a gas turbine (for example fed with the exhaust gases of a vehicle, for mobile applications) or by gearing.

The equipment may comprise a turbine for generating electricity (Rankine cycle).

The equipment can also optionally comprise at least one heat-exchange fluid circuit used for transmitting heat (with or without a change of state) between the heat-transfer fluid circuit and the fluid or body to be heated or cooled.

The equipment may also optionally comprise two (or more) vapor compression circuits containing identical or distinct heat-transfer fluids. For example, the vapor compression circuits may be coupled together.

The vapor compression circuit operates according to a conventional vapor compression cycle. The cycle comprises the change of state of the heat-transfer fluid from a liquid phase (or liquid/vapor two phase state) to a vapor phase at a relatively low pressure, then the compression of the fluid in the vapor phase up to a relatively high pressure, the change of state (condensation) of the heat-transfer fluid of the vapor phase to the liquid phase at a relatively high pressure, and the reduction of the pressure in order to recommence the cycle.

In the case of a cooling process, heat from the fluid or from the body that is being cooled (directly or indirectly, via a heat-exchange fluid) is absorbed by the heat-transfer fluid, during the evaporation of the latter, at a relatively low temperature compared with the surroundings. The cooling processes include air conditioning processes (with mobile equipment, for example in vehicles, or stationary equipment), refrigeration processes and freezing processes or cryogenic processes.

In the case of a heating process, heat is imparted (directly or indirectly, via a heat-exchange fluid) from the heat-transfer fluid, during the condensation thereof, to the fluid or the body that is being heated, at a relatively high temperature compared with the surroundings. The equipment that makes it possible to implement the heat transfer is called, in this case, a "heat pump".

The heat-transfer fluids according to the invention are in particular suitable for heat pumps which make it possible to heat a fluid or a body at a temperature ranging up to 125° C.

It is possible to employ any type of heat exchanger for using the heat-transfer fluids according to the invention, and in particular cocurrent heat exchangers or, preferably, countercurrent heat exchangers.

The heat-transfer fluids used in the context of the present invention are compositions which comprise HFO-1336mzz in combination with HFO-1345fz.

The HFO-1336mzz can be HFO-E-1336mzz or HFO-Z-1336mzz or a mixture of these two isomers. It is preferably HFO-E-1336mzz.

The heat-transfer fluids according to the invention can comprise one or more additional heat-transfer compounds, in addition to the HFO-1336mzz and the HFO-1345fz. These additional heat-transfer compounds can in particular be chosen from hydrocarbons, hydrofluorocarbons, ethers, hydrofluoroethers and fluoroolefins.

According to particular embodiments, the heat-transfer fluids according to the invention can be ternary compositions (consisting of three heat-transfer compounds) or quaternary compositions (consisting of four heat-transfer compounds).

However, binary heat-transfer fluids, i.e. those consisting of a mixture of HFO-1336mzz and HFO-1345fz, are preferred.

According to particular embodiments, the proportion of HFO-1336mzz in the heat-transfer fluid can be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

According to particular embodiments, the proportion of HFO-1345fz in the heat-transfer fluid can be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

The ranges above apply in particular to the binary mixtures of HFO-1336mzz and HFO-1345fz, and in particular to the binary mixtures of HFO-E-1336mzz and HFO-1345fz.

The mixtures contain a high proportion of HFO-1336mzz and a low proportion of HFO-1345fz and have the advantage of not being inflammable.

Among the compositions above, the binary mixtures of HFO-E-1336mzz and HFO-1345fz have the advantage of being azeotropic or azeotrope-like (in particular at a temperature of 50° C.). The azeotrope for this binary mixture is obtained for approximately 25% of HFO-E-1336mzz, at a temperature of 50° C. and at a pressure of 4.7 bar.

The term "azeotrope-like" is used to denote the compositions for which, at constant temperature, the liquid saturation pressure and the vapor saturation pressure are virtually identical (the maximum difference in pressure being 10%, or even advantageously 5%, relative to the liquid saturation pressure). These heat-transfer fluids have an advantage in that they are easy to use. In the absence of significant temperature glide, there is no significant change in the circulating composition, and no significant change either in the composition in the event of a leak.

In addition, it has been found that certain compositions according to the invention have improved performance levels compared with HFC-245fa, in particular for processes for cooling or heating at moderate temperature, i.e. those wherein the temperature of the fluid or of the body cooled is from −15° C. to 15° C., preferably from −10° C. to 10° C. and more particularly preferably from −5° C. to 5° C. (ideally approximately 0° C.). This in particular involves the binary mixtures of HFO-E-1336mzz and HFO-1345fz.

In the processes for "cooling or for heating at moderate temperature" mentioned above, the inlet temperature of the heat-transfer fluid at the evaporator is preferably from −20° C. to 10° C., in particular from −15° C. to 5° C., more particularly preferably from −10° C. to 0° C. and for example approximately −5° C.; and the temperature of the beginning of the condensation of the heat-transfer fluid at the condenser is preferably from 25° C. to 90° C., in particular from 30° C. to 70° C., more particularly preferably from 35° C. to 55° C. and for example approximately 50° C. These processes can be refrigeration processes, air conditioning processes or heating processes.

The compositions according to the invention can also be of use as a blowing agent, a propellant (for example for an aerosol), a cleaning agent or solvent, in addition to their use as heat-transfer fluids.

As a propellant, the compositions according to the invention can be used alone or in combination with known propellants. The propellant comprises, preferably consists of, a composition according to the invention. The active substance that must be propelled can be mixed with the propellant and inert compounds, solvents or other additives, so as to form a composition to be propelled. Preferably, the composition to be propelled is an aerosol. The active substances that must be propelled can, for example, be cosmetic agents, such as deodorants, fragrances, lacquers, cleansers or scrubbing agents, and also therapeutic agents such as medicaments against asthma and against halitosis.

As a blowing agent, the compositions according to the invention can be included in a blowing composition, which preferably comprises one or more other compounds capable of reacting and of forming a foam or cellular structure under suitable conditions, as is known to those skilled in the art.

In particular, the invention proposes a process for preparing an expanded thermoplastic product, first comprising the preparation of a polymeric blowing composition. Typically, the polymeric blowing composition is prepared by plasticizing a polymer resin and by mixing in the compounds of a blowing agent composition at an initial pressure. The plasticizing of the polymer resin can be carried out under the effect of heat, by heating the polymer resin so as to soften it sufficiently to mix in a blowing agent composition. Generally, the plasticizing temperature is close to the glass transition temperature or to the melting point for crystalline polymers.

Other uses of the compositions according to the invention include uses as solvents, cleaning agents or the like. Mention may, for example, be made of vapor degreasing, precision cleaning, cleaning of electronic circuits, dry-cleaning, abrasive cleaning, solvents for the deposition of lubricants and release agents, and other solvent or surface treatments.

EXAMPLES

The following examples illustrate the invention without limiting it.

Example 1—Azeotropic or Azeotrope-Like Compositions

A vacuum cell equipped with a sapphire tube is heated to 50° C. with an oil bath. Once thermal equilibrium has been reached, the cell is charged with HFO-1345fz, and the pressure at which the equilibrium is achieved is recorded. An amount of HFO-E-1336mzz is introduced into the cell, and the content is mixed in order to accelerate equilibration. At equilibrium, a minimum amount of sample is withdrawn from the gas phase and from the liquid phase for gas chromatography analysis with a thermal detector.

The equilibrium data obtained with various compositions of HFO-1345fz and of HFO-E-1336mzz are represented in FIG. 1.

Example 2—Results for a Refrigeration at Moderate Temperature, Comparison with HFC-245fa The RK-Soave equation is used to calculate the densities, enthalpies, entropies and liquid/vapor equilibrium data of the mixtures. The use of this equation requires knowledge of the properties of the pure substances used in the mixtures in question and also the interaction coefficients for each binary mixture.

The data available for each pure substance are the boiling point, the critical temperature and the critical pressure, the curve of pressure as a function of the temperature starting from the boiling point up to the critical point, the saturated liquid and saturated vapor densities as a function of the temperature.

The data on HFCs are published in the ASHRAE Handbook 2005, chapter 20, and also are available from Refrop (software developed by NIST for calculating the properties of refrigerants).

The data of the temperature-pressure curve of the HFOs are measured by the static method. The critical temperature and the critical pressure are measured using a C80 calorimeter sold by Setaram.

The RK-Soave equation uses coefficients of binary interaction to represent the behavior of products in mixtures. The coefficients are calculated as a function of the experimental liquid/vapor equilibrium data.

For evaluating the energy performance levels, a compression system equipped with a countercurrent evaporator and condenser, with a screw compressor and with a pressure-reducing valve is considered.

The system operates with 5° C. of overheat. The evaporation temperature is −5° C. and the condensation temperature is 50° C.

The coefficient of performance (COP) is defined as being the useful power supplied by the system over the power provided or consumed by the system.

The Lorenz coefficient of performance (COPLorenz) is a reference coefficient of performance. It depends on temperatures and is used to compare the COPs of the various fluids.

The Lorenz coefficient of performance is defined as follows (the temperatures T are in K):

$$T_{average}^{condenser} = T_{inlet}^{condenser} - T_{outlet}^{condenser}$$

$$T_{average}^{evaporator} = T_{outlet}^{evaporator} - T_{inlet}^{evaporator}$$

The Lorenz COP in the case of conditioned air and of refrigeration is:

$$COPlorenz = \frac{T_{average}^{evaporator}}{T_{average}^{condenser} - T_{average}^{evaporator}}$$

The Lorenz COP in the case of heating is:

$$COPlorenz = \frac{T_{average}^{condenser}}{T_{average}^{condenser} - T_{average}^{evaporator}}$$

For each composition, the coefficient of performance of the Lorenz cycle is calculated as a function of the corresponding temperatures.

In the tables which follow, "T" denotes the temperature, "P" denotes the pressure, "% CAP" denotes the volumetric capacity of the fluid relative to the reference fluid indicated on the first line and "% COP/COPLorenz" denotes the ratio of the COP of the system relative to the COP of the corresponding Lorenz cycle.

The results obtained are the following:

| Composition (%) | | T evaporator outlet (° C.) | T compressor outlet | T condenser outlet = (° C.) | T pressure-reducing value inlet (° C.) | P evaporator (bar) | P condenser (bar) | Compression ratio (w/w) | Isentropic efficiency | % CAP | % COP/ COPLorenz |
|---|---|---|---|---|---|---|---|---|---|---|---|
| HFC-245fz | | −5 | 77 | 50 | 47 | 0.4 | 3.4 | 8.3 | 57.6 | 100 | 45 |
| HFO-1345fz | HFO-E-1336mzz | | | | | | | | | | |
| 100 | 0 | −5 | 56 | 50 | 47 | 0.7 | 4.7 | 6.8 | 68.3 | 131 | 48 |
| 90 | 10 | −5 | 56 | 50 | 47 | 0.7 | 4.7 | 6.8 | 68.1 | 131 | 47 |
| 80 | 20 | −5 | 56 | 50 | 47 | 0.7 | 4.7 | 6.9 | 67.8 | 130 | 47 |
| 70 | 30 | −5 | 56 | 50 | 47 | 0.7 | 4.7 | 6.9 | 67.4 | 130 | 47 |
| 60 | 40 | −5 | 56 | 50 | 47 | 0.7 | 4.7 | 7.0 | 67.0 | 129 | 47 |
| 50 | 50 | −5 | 56 | 50 | 47 | 0.7 | 4.7 | 7.1 | 66.5 | 128 | 46 |
| 40 | 60 | −5 | 56 | 50 | 47 | 0.6 | 4.6 | 7.2 | 66.0 | 126 | 46 |
| 30 | 70 | −5 | 56 | 50 | 47 | 0.6 | 4.6 | 7.3 | 65.4 | 124 | 46 |
| 20 | 80 | −5 | 56 | 50 | 47 | 0.6 | 4.5 | 7.3 | 64.7 | 122 | 45 |
| 10 | 90 | −5 | 56 | 50 | 47 | 0.6 | 4.4 | 7.4 | 64.1 | 119 | 45 |
| 0 | 100 | −5 | 56 | 50 | 47 | 0.6 | 4.3 | 7.5 | 63.7 | 116 | 45 |

The invention claimed is:

1. A composition consisting of:
   from 10% to 60% of trans-1,1,1,4,4,4-hexafluorobut-2-ene;
   from 40% to 90% of 3,3,4,4,4-pentafluorobut-1-ene; and
   optionally one or more additives selected from the group consisting of lubricants, stabilizers, surfactants, tracers, fluorescent agents, odorous agents solubilizing agents, and mixtures thereof, wherein the composition is azeotropic or azeotrope-like.

2. A heat-transfer fluid comprising the composition as claimed in claim 1.

3. The composition as claimed in claim 1, the composition including the one or more additives selected from the group consisting of lubricants, stabilizers, surfactants, tracers, fluorescent agents, odorous agents solubilizing agents, and mixtures thereof.

4. Heat-transfer equipment comprising a vapor compression circuit containing a composition as claimed in claim 1 as a heat-transfer fluid.

5. The heat-transfer equipment as claimed in claim 4, selected from the group consisting of mobile heat-pump heating, stationary heat-pump heating, air conditioning, refrigeration equipment, freezing equipment and Rankine cycles.

6. A blowing agent comprising the composition as claimed in claim 1 and one or more compounds capable of reacting and forming a foam or cellular structure.

7. A propellant comprising the composition as claimed in claim 1 and an aerosol.

8. The composition as claimed in claim 1, wherein the trans-1,1,1,4,4,4-hexafluorobut-2-ene is from 20% to 60% and the 3,3,4,4,4-pentafluorobut-1-ene is from 40% to 80%.

9. The composition as claimed in claim 1, wherein the trans-1,1,1,4,4,4-hexafluorobut-2-ene is from 40% to 60% and the 3,3,4,4,4-pentafluorobut-1-ene is from 40% to 60%.

10. The composition as claimed in claim 1, wherein the trans-1,1,1,4,4,4-hexafluorobut-2-ene is from 45% to 55% and the 3,3,4,4,4-pentafluorobut-1-ene is from 45% to 55%.

11. The composition as claimed in claim 1, wherein the trans-14,1,4,4,4-hexafluorobut-2-ene is from 15% to 50% and the 3,3,4,4,4-pentafluorobut-1-ene is from 50% to 85%.

12. The composition as claimed in claim 1, wherein the trans-1,1,1,4,4,4-hexafluorobut-2-ene is from 15% to 30% and the 3,3,4,4,4-pentafluorobut-1-ene is from 70% to 85%.

13. A process for heating or for cooling a fluid or a body by means of a vapor compression circuit containing a heat-transfer fluid, said process successively comprising evaporation of the heat-transfer fluid, compression of the heat-transfer fluid, condensation of the heat-transfer fluid and expansion of the heat-transfer fluid, wherein the heat-transfer fluid is a composition as claimed in claim 1.

14. The process as claimed in claim 13, which is a process for cooling a fluid or a body, wherein the temperature of the fluid or of the body cooled is from −15° C. to 15° C.

15. A process for reducing the environmental impact of heat-transfer equipment comprising a vapor compression circuit containing an initial heat-transfer fluid, said process comprising a step of replacing the initial heat-transfer fluid in the vapor compression circuit with a final heat-transfer fluid, the final heat-transfer fluid having a GWP which is lower than the initial heat-transfer fluid, wherein the final heat-transfer fluid is a composition as claimed in claim 1.

16. The process as claimed in claim 13, which is a process for heating a fluid or a body, wherein the temperature of the fluid or of the body heated is from 30° C. to 90° C.

* * * * *